United States Patent
Tomono et al.

(10) Patent No.: US 10,062,907 B2
(45) Date of Patent: Aug. 28, 2018

(54) PERFORATED FILM, COATING FILM, AND ELECTRICITY STORAGE DEVICE

(71) Applicant: ASAHI KASEI PAX CORPORATION, Tokyo (JP)

(72) Inventors: Masaki Tomono, Tokyo (JP); Jun Muraoka, Tokyo (JP); Isamu Sakayori, Tokyo (JP)

(73) Assignee: ASAHI KASEI PAX CORPORATION, Tokyo (JP)

( * ) Notice: Subject to any disclaimer, the term of this patent is extended or adjusted under 35 U.S.C. 154(b) by 342 days.

(21) Appl. No.: 14/889,567

(22) PCT Filed: Apr. 23, 2014

(86) PCT No.: PCT/JP2014/061476
§ 371 (c)(1),
(2) Date: Nov. 6, 2015

(87) PCT Pub. No.: WO2014/181689
PCT Pub. Date: Nov. 13, 2014

(65) Prior Publication Data
US 2016/0087279 A1    Mar. 24, 2016

(30) Foreign Application Priority Data

May 9, 2013   (JP) .................... 2013-099349
Mar. 4, 2014  (JP) .................... 2014-041600

(51) Int. Cl.
*H01M 4/70* (2006.01)
*H01M 4/74* (2006.01)
(Continued)

(52) U.S. Cl.
CPC .............. *H01M 4/70* (2013.01); *B26D 3/085* (2013.01); *B26F 1/18* (2013.01); *B26F 1/20* (2013.01);
(Continued)

(58) Field of Classification Search
CPC .................................................. B26F 1/18–1/20
See application file for complete search history.

(56) References Cited

U.S. PATENT DOCUMENTS

| 2003/0000357 | A1 | 1/2003 | Tanaka |
| 2004/0137202 | A1 | 7/2004 | Hamilton et al. |
| 2012/0244412 | A1* | 9/2012 | Pascaly ............. B01D 67/0032 429/144 |

FOREIGN PATENT DOCUMENTS

| DE | 2614160  | 10/1977 |
| DE | 19755596 | 2/1999  |

(Continued)

OTHER PUBLICATIONS

Machine translation of JP 2005-085562 A (Year: 2005).*

(Continued)

*Primary Examiner* — Maria Laios
*Assistant Examiner* — Robert S Carrico
(74) *Attorney, Agent, or Firm* — Greenblum & Bernstein, P.L.C.

(57) ABSTRACT

Tensile strength in a width direction and a longitudinal direction is improved without damaging a ventilation characteristic. A perforated film is a perforated film provided with holes, each of the holes is arranged at an intersection of a plurality of virtual lines extending along a direction and a plurality of virtual lines extending along a direction, and the direction is different from the width direction and the longitudinal direction. The direction and the direction may be both inclined at an angle larger than 30° and smaller than 60° to the width direction.

8 Claims, 12 Drawing Sheets

(51) Int. Cl.
  *B29D 28/00*    (2006.01)
  *B29D 7/01*     (2006.01)
  *B26D 3/08*     (2006.01)
  *B26F 1/20*     (2006.01)
  *B26F 1/18*     (2006.01)
  *H01M 10/052*   (2010.01)

(52) U.S. Cl.
  CPC ............... *B29D 7/01* (2013.01); *B29D 28/00*
    (2013.01); *H01M 4/742* (2013.01); *B26F*
    *2210/00* (2013.01); *B26F 2210/12* (2013.01);
    *H01M 10/052* (2013.01)

(56) References Cited

FOREIGN PATENT DOCUMENTS

| | | |
|---|---|---|
| FR | 1375711 | 10/1964 |
| GB | 1121901 | 7/1968 |
| JP | 11-67217 | 3/1999 |
| JP | 2004-75097 | 3/2004 |
| JP | 2005-85562 | 3/2005 |
| JP | 2005-246484 | 9/2005 |
| JP | 2006-503771 | 2/2006 |
| JP | 2012180583 A * | 9/2012 |
| JP | 2013069632 A * | 4/2013 |
| WO | 2012/096020 | 7/2012 |

OTHER PUBLICATIONS

Search Report issued in European Patent Office (EPO) Patent Application No. 14793986.2, dated May 4, 2016.
Search Report in PCT/JP2014/061476 Patent Application No. , dated Jul. 15, 2014.
International Preliminary Report on Patentability, dated Nov. 19, 2015.

* cited by examiner

PERFORATED FILM, COATING FILM, AND ELECTRICITY STORAGE DEVICE

TECHNICAL FIELD

The present invention relates to a perforated film, a coating film, and an electricity storage device.

BACKGROUND ART

There is a so-called perforated film obtained by providing holes on a sheet manufactured from a synthetic resin, a film, metallic foil or the like. The perforated film is used for various uses. Examples of the uses include freshness preservation of vegetables, fruits or the like, a back sheet of diapers, sanitary goods or the like, a deoxidizer, and a moisture absorbent. According to the respective uses, gas permeation amounts for air, oxygen, hydrogen, steam or the like are controlled by a shape, a size, the number and the like of holes provided on the perforated film.

As a method of obtaining such a perforated film, there is a method of perforating a perforation target object by a perforating apparatus including a pair of roll-like cutters (for example, see Patent Literature 1 and Patent Literature 2). In this perforating apparatus, a plurality of first cutting edges provided continuously in a circumferential direction are arranged in an axial direction on a peripheral surface of one roll-like cutter, and a plurality of second cutting edges provided continuously in the axial direction are arranged in the circumferential direction on a peripheral surface of the other roll-like cutter. By using the perforating apparatus, a sheet which is a perforation target object is held between the pair of roll-like cutters, the pair of roll-like cutters are rotated in mutually opposite directions, and thus the sheet is perforated at a part where the first cutting edge and the second cutting edge intersect.

CITATION LIST

Patent Literature

[Patent Literature 1] International Publication No. WO 2012096020
[Patent Literature 2] France Patent Application Publication No. 1375711

SUMMARY OF INVENTION

Technical Problem

Now, when processing a perforated film, tension is sometimes applied in a length direction of the film or a width direction of the film. For example, in laminate processing, coating processing, slit processing, bag making, filling, molding or the like, tension is sometimes applied in a longitudinal direction (MD: Machine Direction) of the film. Also, in order to prevent a sealing defect caused during heat sealing when sealing a filler, tension is sometimes applied in the width direction (TD: Transverse Direction) of the film.

In a perforated film formed by a perforating apparatus in examples described in Patent Literature 1 and Patent Literature 2, since holes and tooth marks are arranged along the longitudinal direction and the width direction, tensile strength in the longitudinal direction and the width direction is low. In the case that the tension is applied in the longitudinal direction or the width direction, a provided hole is torn and becomes big, or the perforated film is broken, and thus gas permeability of the perforated film sometimes becomes higher than designed.

Therefore, an object of the present invention is to provide a perforated film having a structure capable of improving tensile strength in a longitudinal direction and/or a width direction without damaging gas permeability, a coating film, and an electricity storage device.

Solution to Problem

A perforated film relating to one aspect of the present invention is a perforated film provided with holes. Each of the holes is disposed on an intersection of a first cut provided on a plurality of first virtual lines extending along a first direction and a second cut provided on a plurality of second virtual lines extending along a second direction, and the first direction is different from a width direction and a direction orthogonal to the width direction.

As described above, in a processing step or the like, tension is sometimes applied to the perforated film in the width direction or the longitudinal direction. Therefore, in the perforated film, when cuts and holes are arrayed along the width direction and the longitudinal direction, tensile strength in the direction declines so that fracture tends to occur in the processing step or the like. In contrast, according to the perforated film relating to one aspect of the present invention, since the holes are disposed on intersections of the first cuts provided on the first virtual lines and the second cuts provided on the second virtual lines, they are arrayed along the first virtual lines and the second virtual lines. Then, since the first virtual line extends in the first direction different from the width direction and the direction (longitudinal direction) orthogonal to the width direction, an array of the holes along the first virtual line is inclined to the width direction and the longitudinal direction. Also, the array of the holes along the second virtual line is different from at least the width direction and the longitudinal direction, compared to a configuration that the holes are arrayed along the width direction and the longitudinal direction, the tensile strength in the direction different from the second direction of the width direction and the longitudinal direction is improved. As a result, in the case that tension is applied in the direction different from an array direction of the holes of the width direction and the longitudinal direction, occurrence of fracture can be suppressed, and processability can be improved. Also, in the case that a distance between two holes adjacent to each other along the first virtual line and a distance between two holes adjacent to each other along the second virtual line are made the same as a distance between two holes adjacent to each other in the configuration that the holes are arrayed along the width direction and the longitudinal direction, the number of the holes per stipulated area (a perforation rate) is not reduced.

The second direction may be different from the width direction and the direction orthogonal to the width direction. In this case, since the first virtual line extends in the first direction different from the width direction and the direction (longitudinal direction) orthogonal to the width direction and the second virtual line extends in the second direction different from the width direction and the direction (longitudinal direction) orthogonal to the width direction, the array of the holes along the first virtual line and the array of the holes along the second virtual line are inclined to the width direction and the longitudinal direction. Therefore, since the array of the holes on the perforated film is inclined to both of the width direction and the longitudinal direction, compared to the configuration that the holes are arrayed along the width direction and the longitudinal direction, the tensile strength in the width direction and the longitudinal direction is improved. As a result, in the case that tension is applied in the width direction and the longitudinal direction, occurrence of fracture can be suppressed, and processability can be further improved.

The first direction may be inclined at an angle larger than 30° and smaller than 60° to the width direction, and the second direction may be inclined at an angle larger than 30° and smaller than 60° to the width direction. Since the first virtual line extends in the first direction inclined at the angle larger than 30° and smaller than 60° to the width direction, the first cuts and the array of the holes along the first virtual line are inclined at the angle larger than 30° and smaller than 60° to the width direction. Also, the second cuts and the array of the holes along the second virtual line also extend in the second direction inclined at the angle larger than 30° and smaller than 60° to the width direction. Therefore, compared to a configuration of cuts and an array of holes excluding the above-described range, the tensile strength in the width direction and the longitudinal direction is improved by stress relaxation. As a result, in the case that tension is applied in the width direction and the longitudinal direction, occurrence of fracture can be suppressed, and processability can be further improved. Also, since improvement of the tensile strength enables the shape and size of the holes to be held in a uniform state, a gap of a gas amount that permeates the perforated film in a design value can be suppressed.

In the first direction, a ratio of a length $\alpha$ of the first cut and a diameter $\gamma$ of the hole may be $0 < \alpha/\gamma \leq 500$, and in the second direction, a ratio of a length $\beta$ of the second cut and the diameter $\gamma$ of the hole may be $0 < \beta/\gamma \leq 500$. By setting the lengths of the first cut and the second cut in the above-described range to the diameter of the hole, tensile strength decline in the case that tension is applied in the width direction and the longitudinal direction can be suppressed. As a result, occurrence of fracture during processing can be suppressed, and processability can be further improved.

A difference between a first angle which is an inclination angle of the first virtual line to the width direction and a second angle which is an inclination angle of the second virtual line to the width direction may be −5° or larger and +5° or smaller. In this case, since the holes are approximately arranged symmetrically to the width direction, stability of the tensile strength of the perforated film is improved. As a result, in the case that tension is applied in the longitudinal direction to the perforated film, deformations of a hole shape and a film can be reduced.

The first virtual line and the second virtual line may orthogonally intersect. Also in this case, when tension is applied in the direction different from the array direction of the holes in the width direction and the longitudinal direction, occurrence of fracture can be suppressed, and processability can be improved.

Two holes arranged closest among the holes may be lined along a direction different from the width direction and the direction orthogonal to the width direction. The tensile strength in the perforated film declines as a distance between the two holes adjacent to each other along the direction that tension is applied is shorter. Therefore, by arraying the two holes arranged closest along the direction different from the width direction and the longitudinal direction, decline of the tensile strength in the width direction and the longitudinal direction can be suppressed.

A coating film relating to another aspect of the present invention may comprise one of the perforated films described in the paragraphs above, and a membrane formed by applying a liquid or a viscous body on at least one surface of the perforated film and drying the liquid or the viscous body. Thus, the coating film that protects characteristics that the perforated film has, or has new characteristics can be formed. Also, for the membrane formed on at least one surface of the perforated film, by a hole shape of the perforated film, a high anchor effect can be obtained. Therefore, the membrane is not easily detached from the perforated film, and the characteristics of the coating film can be substantially improved.

An electricity storage device relating to another aspect of the present invention may comprise an electrode including one of the perforated films described in the paragraphs above, and a coated material formed by applying electrode paste on at least one surface of the perforated film and drying the electrode paste. By using the electrode having one of the perforated films described in the paragraphs above in an electricity storage device or the like, excellent electric characteristics are demonstrated.

Advantageous Effects of Invention

According to the present invention, tensile strength in a width direction and a longitudinal direction can be improved without damaging gas permeability.

DESCRIPTION OF EMBODIMENTS

Hereinafter, embodiments of the present invention will be described in detail with reference to the accompanying drawings. In description of the drawings, same signs are attached to the same or equivalent elements, and redundant description is omitted.

First Embodiment

Figure 1:
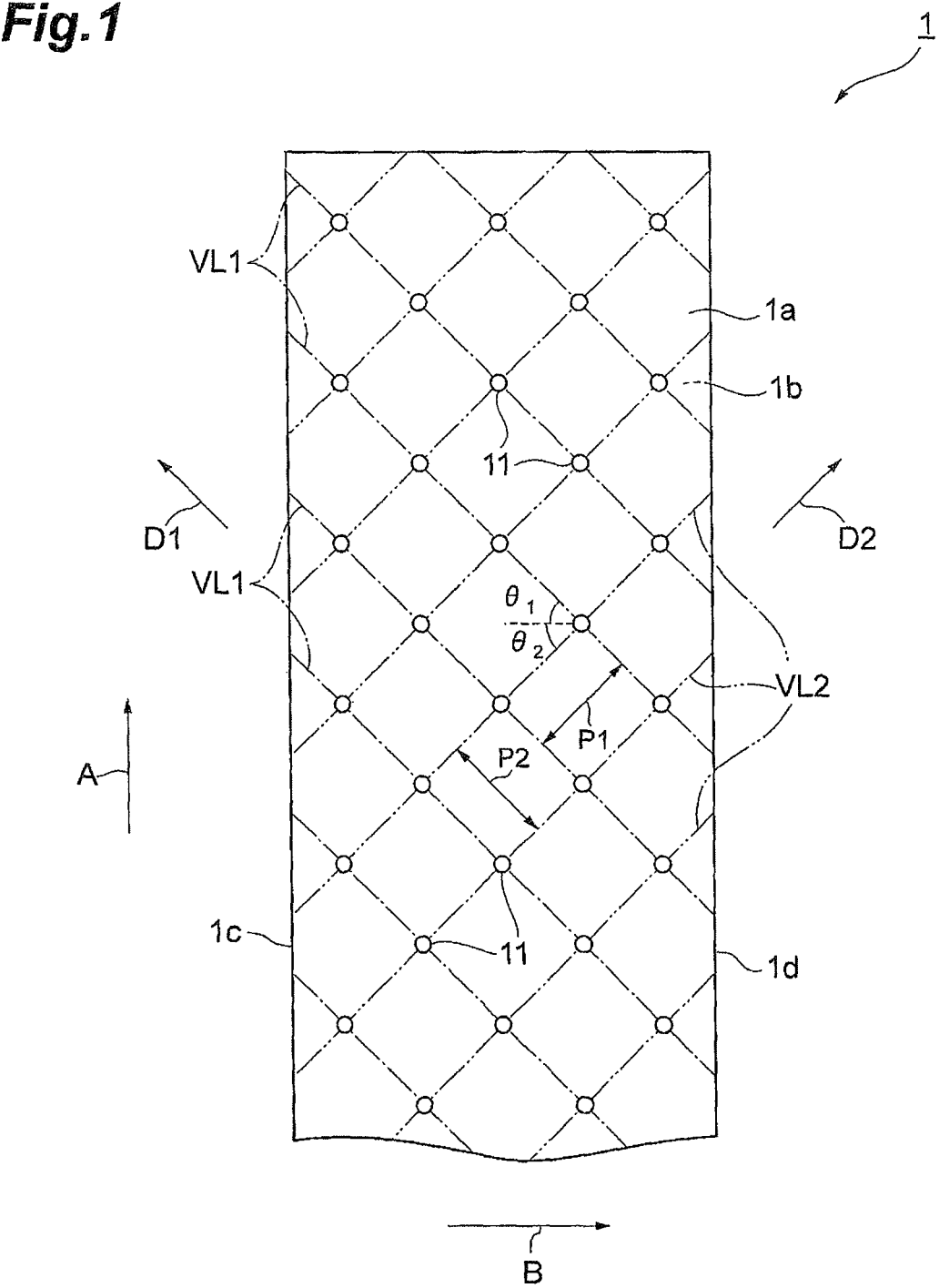
FIG. 1 is a plan view schematically illustrating a configuration of a perforated film relating to a first embodiment.

FIG. 1 is a plan view schematically illustrating a configuration of a perforated film relating to a first embodiment. As illustrated in FIG. 1, a perforated film 1 is a long-length film extending in a direction A, and is provided with a plurality of holes 11. The direction A is a longitudinal direction (MD). A direction B orthogonal to the direction A is a width direction (TD). The perforated film 1 can be used for various uses such as vaporized substance permeation of an insect-repelling component permeable membrane or the like, sterilization gas permeation of an ETO gas permeable membrane or the like, aromatic substance permeation of an aromatic component permeable membrane or the like, contents generation gas permeation of a fermented food gas permeable membrane or the like, a flexible substrate, an electricity storage device, a filter, and steam vent during microwave oven cooking, for example.

The perforated film 1 may be a roll-like wound body or may be a cut piece. A length and a width of the perforated film 1 are not stipulated in particular, and are preferably such a length and a width that the perforated film 1 can be rewound or set in equipment such as a film forming machine, laminator, a slit machine or a filler machine in which it is manufactured and used as the roll-like wound body. As one example, when processing is performed in a roll-to-roll manner by using a slit machine, it is preferable that the length of the perforated film 1 is 2000 m or shorter, and it is preferable that the width of the perforated film 1 is 1500 mm or shorter. Also, a thickness of the perforated film 1 is about 6 µm to 200 µm for example. A perforation rate of the perforated film 1 can be set according to a use, and is about $1\times10^{-6}\%$ to $1\times10^{-1}\%$ for example. In the case of the perforated film 1 for which perforation of about $1\times10^{-3}\%$ is executed to a biaxially oriented polypropylene film of 40 µm, a nitrogen permeation amount of the perforated film 1 is about $6.0\times10^{6}$ cm$^3$/(m$^2$·day·atm).

As a film material configuring the perforated film 1, for example, polyethylene terephthalate (PET), biaxially oriented nylon (ONy), biaxially oriented polypropylene (OPP), polyimide, ethylene-vinyl alcohol copolymer (EVOH), low-density polyethylene (LDPE), linear low-density polyethylene (LLDPE) or the like can be used. In addition, as the perforated film 1, metallic foil such as aluminum foil and copper foil, cellophane, paper, non-woven fabric or the like can be also used.

The perforated film 1 has one surface 1a and the other surface 1b on an opposite side of the one surface 1a. The perforated film 1 has a side 1c and a side 1d facing each other in the direction B (width direction). The side 1c and the side 1d extend along the direction A (longitudinal direction).

The holes 11 are the holes passing through the perforated film 1, and has a circular shape or a square shape for example. A diameter of the holes 11 is about 10 µm to 0.2 mm (200 µm) for example. The holes 11 are regularly arranged. Each of the holes 11 is arranged at an intersection of a cut provided on a plurality of virtual lines VL1 (first virtual lines) extending along a direction D1 (first direction) and a cut provided on a plurality of virtual lines VL2 (second virtual lines) extending along a direction D2 (second direction) (cuts will be described later).

The direction D1 is different from the direction A and the direction B, and is inclined at an angle $\theta_1$ (first angle) to the direction B. That is, the virtual line VL1 is inclined at the angle $\theta_1$ to the direction B. The direction D2 is different from the direction A and the direction B, and is inclined at an angle $\theta_2$ (second angle) on a side opposite to the inclining direction of the direction D1 to the direction B. That is, the virtual line VL2 is inclined at the angle $\theta_2$ to the direction B. The angle $\theta_1$ and the angle $\theta_2$ are larger than 30° and are smaller than 60°. Also, the angle $\theta_1$ and the angle $\theta_2$ are the same or almost the same, and a difference between the angle $\theta_1$ and the angle $\theta_2$ is about −5° or larger and +5° or smaller for example. In an example in FIG. 1, the angle $\theta_1$ is 45° and the angle $\theta_2$ is 45°. Also, the virtual line VL1 and the virtual line VL2 orthogonally intersect.

The plurality of virtual lines VL1 are arrayed at a fixed pitch P1, and the pitch P1 is about 0.5 mm or longer for example. The plurality of virtual lines VL2 are arrayed at a fixed pitch P2, and the pitch P2 is about 0.5 mm or longer for example. In the example in FIG. 1, since the pitch P1 and the pitch P2 are the same, a plurality of squares are formed by the virtual lines VL1 and the virtual lines VL2. One diagonal line of the square is along the direction A, and the other diagonal line is along the direction B. The holes 11 are positioned at vertexes of the individual squares. The pitch P1 and the pitch P2 are not limited to 0.5 mm or longer, and can be set to be shorter than 0.5 mm as needed.

Figure 2:
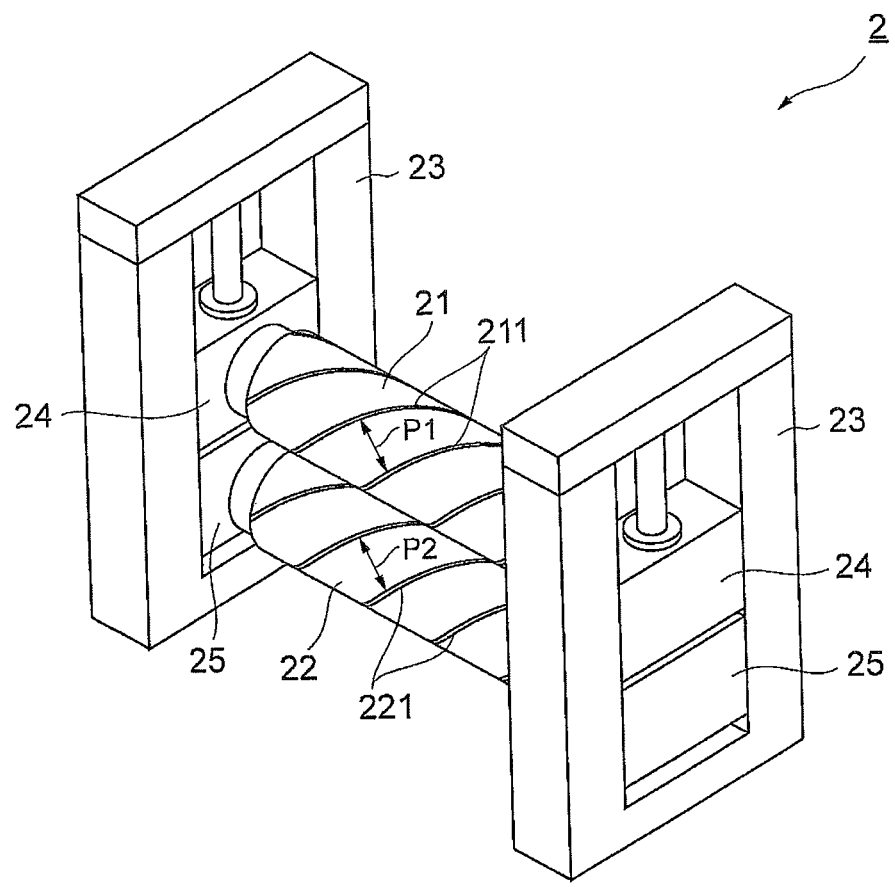
FIG. 2 is a perspective view schematically illustrating a configuration of a manufacturing apparatus for manufacturing the perforated film in FIG. 1.
Figure 3:
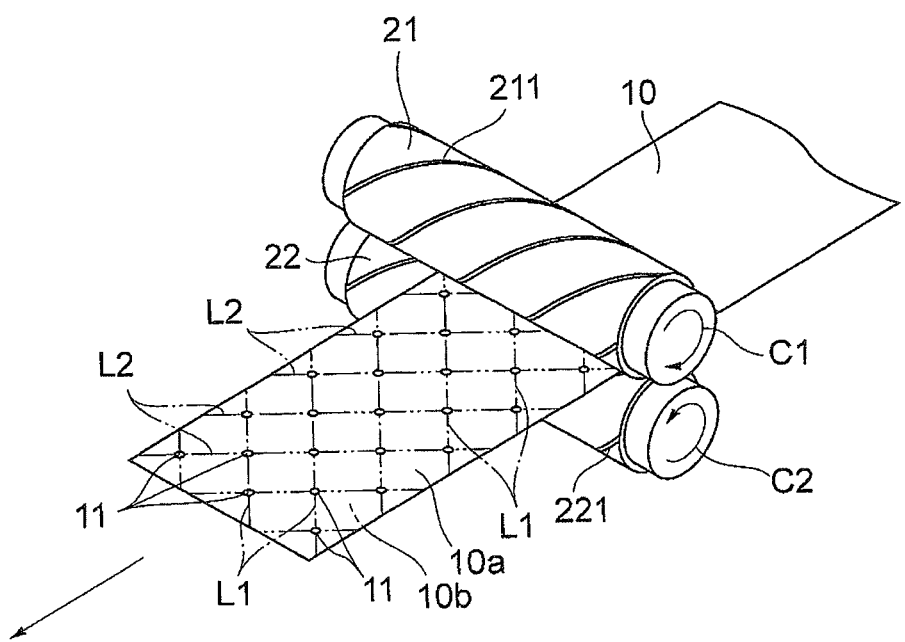
FIG. 3 is a perspective view for illustrating a main part of the manufacturing apparatus in FIG. 2.

FIG. 2 is a diagram schematically illustrating a configuration of a manufacturing apparatus 2 for manufacturing the perforated film 1. FIG. 3 is a diagram for illustrating a main part of the manufacturing apparatus 2. As illustrated in FIG. 2 and FIG. 3, the manufacturing apparatus 2 includes a roll cutter 21 and a roll cutter 22.

The roll cutter 21 and the roll cutter 22 are cylindrical or columnar cutters. The roll cutter 21 and the roll cutter 22 are arranged facing each other. An axis of the roll cutter 21 and an axis of the roll cutter 22 are parallel to each other, and the roll cutter 21 and roll cutter 22 are separated so as to hold a perforation target object therebetween. Supports 24 are provided on both ends in an axial direction of the roll cutter 21, and the roll cutter 21 is supported to a frame 23 rotatably around the axis through the supports 24. Supports 25 are provided on both ends in an axial direction of the roll cutter 22, and the roll cutter 22 is supported to the frame 23 rotatably around the axis through the supports 25. The roll cutter 21 and the roll cutter 22 are rotated in linkage, and a rotating direction C1 of the roll cutter 21 is opposite to a rotating direction C2 of the roll cutter 22.

On a peripheral surface of the roll cutter 21, cutting edges 211 are provided. The plurality of cutting edges 211 are inclined at the angle $\theta_1$ to the axial direction of the roll cutter 21, provided continuously in a circumferential direction, and provided at the pitch P1. On a peripheral surface of the roll cutter 22, cutting edges 221 are provided. The plurality of cutting edges 221 are inclined at the angle $\theta_2$ to the axial direction of the roll cutter 22, provided continuously in the circumferential direction, and provided at the pitch P2. The cutting edges 211 and the cutting edges 221 are inclined in the same direction to the axial direction. Also, the cutting edges 211 and the cutting edges 221 may be provided intermittently at the pitch P1 and the pitch P2 respectively, or may be helically provided.

Figure 4:
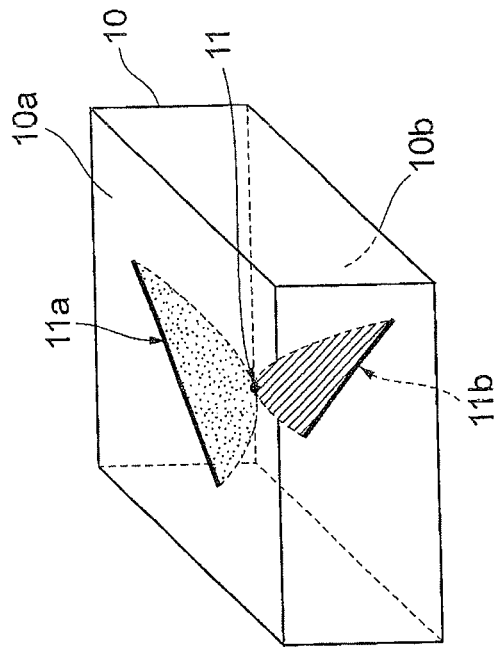
FIG. 4(a) is an enlarged plan view schematically illustrating holes in FIG. 1.
FIG. 4(b) is an enlarged perspective view schematically illustrating holes in FIG. 1.
Figure 4:
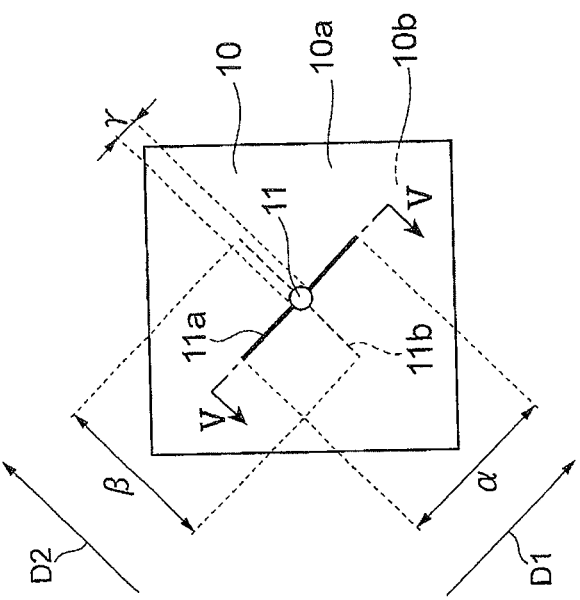
Figure 5:
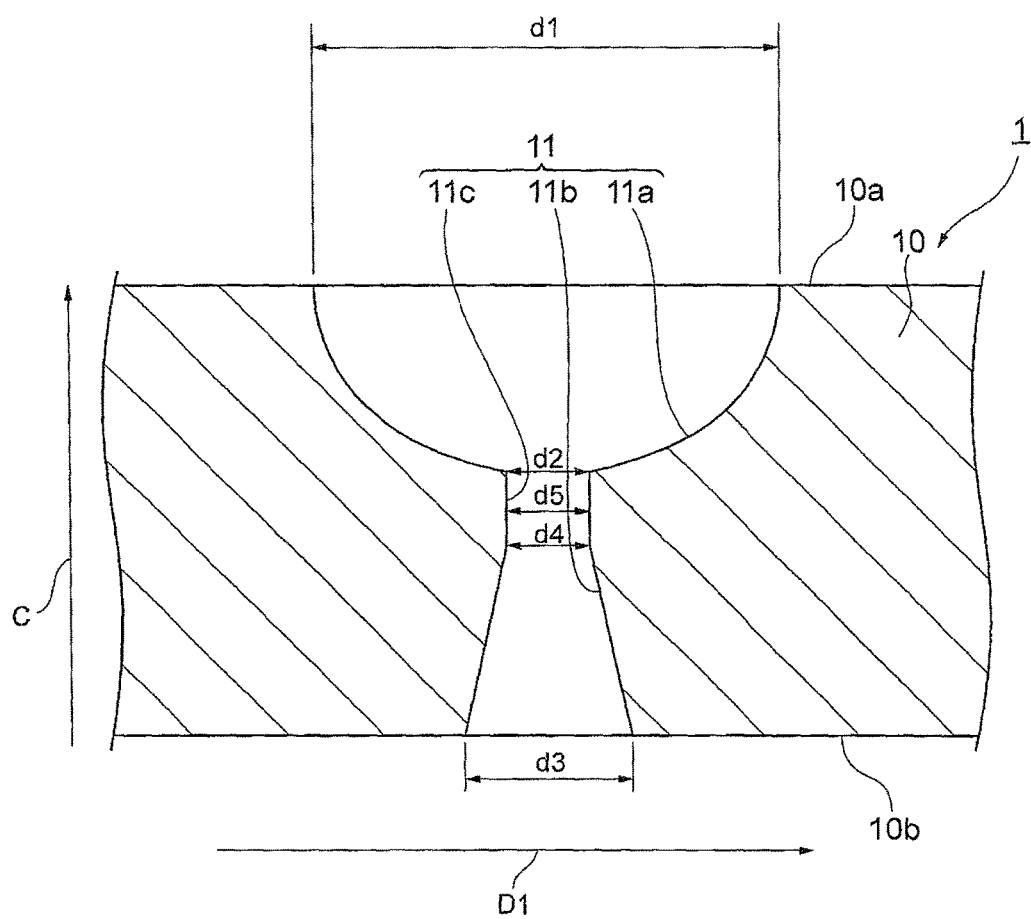
FIG. 5 is a sectional view of a V-V line arrow part of FIG. 4(a).

Next, using FIG. 3 to FIG. 5, one example of a manufacturing method of the perforated film 1 will be described. FIG. 4(a) is an enlarged plan view schematically illustrating the periphery of the holes 11, and FIG. 4(b) is an enlarged perspective view schematically illustrating the periphery of the holes 11. FIG. 5 is a sectional view of a V-V line arrow part of FIG. 4(a).

As illustrated in FIG. 3, a film 10 which is a perforation target object is prepared first. For example, as the film 10, a long-length film such as a roll-like film can be used. Then, one end of the film 10 is held between the roll cutter 21 and the roll cutter 22 of the manufacturing apparatus 2. At the time, the cutting edges 211 of the roll cutter 21 are in contact with one surface 10a of the film 10, and the cutting edges 221 of the roll cutter 22 are in contact with the other surface 10b of the film 10. In this state, by rotating the roll cutter 21 and the roll cutter 22 in linkage, the film 10 is conveyed along the longitudinal direction of the film 10, and the film 10 is wound in a roll shape.

In the manufacturing apparatus 2, the cutting edges 211 are pressed to one surface 10a of the film 10, and lines L1 which are traces of the cutting edges 211 are formed on one surface 10a. Also, the cutting edges 221 are pressed to the other surface 10b of the film 10, and lines L2 which are traces of the cutting edges 221 are formed on the other surface 10b. In the case of viewing from a side of one surface 10a of the film 10, the plurality of lines L1 are inclined at the angle $\theta_1$ to the width direction of the film 10, extend in the longitudinal direction of the film 10, and are formed at the pitch P1. In the case of viewing from a side of one surface 10a of the film 10, the plurality of lines L2 are inclined at the angle $\theta_2$ on the side opposite to the inclining direction of the lines L1 to the width direction of the film 10, extend in the longitudinal direction of the film 10, and are formed at the pitch P2.

As illustrated in FIG. 4, in the vicinity of a part where the cutting edge 211 and the cutting edge 221 intersect, that is, a part where the line L1 and the line L2 intersect in a plan view, the film 10 is pressurized simultaneously from one surface 10a and the other surface 10b. Therefore, a cut (first cut) 11a is formed on one surface 10a of the film 10, and a cut (second cut) 11b is formed on the other surface 10b of the film 10. The cut 11a is a part cut toward the other surface 10b, and a cut amount gradually increases toward the part where the cutting edge 211 and the cutting edge 221 intersect. The cut 11b is a part cut toward one surface 10a, and the cut amount gradually increases toward the part where the cutting edge 211 and the cutting edge 221 intersect. Since these cuts 11a and 11b have a shape that the cut amount gradually increases, resistance and pressure loss when a gas, a liquid and a viscous body permeate are reduced, and gas permeability and liquid permeability are improved. Then, the film 10 is penetrated in a thickness direction at the parts where the cutting edges 211 and the cutting edges 221 intersect, and the holes 11 are formed.

In this way, the holes 11 are continuously formed on the film 10 at the parts where the cutting edges 211 and the cutting edges 221 intersect, and the perforated film 1 is manufactured. The lines L1 formed in a process of manufacturing the perforated film 1 coincide with the virtual lines VL1 (see FIG. 1), and the lines L2 coincide with the virtual lines VL2 (see FIG. 1).

At the part where the line L1 and the line L2 intersect, the cutting edge 211 provided on the circumference of the roll cutter 21 and the cutting edge 221 provided on the circumference of the roll cutter 22 are brought into contact with the film 10. Therefore, a pressure from one surface 10a of the film 10 and a pressure from the other surface 10b are equally applied to the film 10. Thus, unevenness such as burrs and flash is not easily generated in the vicinity of the hole 11, and the perforated film 1 having a flat surface is obtained even after the hole 11 is formed. Wrinkles and bumps are not easily generated even when the perforated film 1 is wound in the roll shape, a wound state is excellent, a winding mark is not made, and an excellent product is obtained.

Also, in order to keep film strength that can withstand tension or the like during processing, it is preferable that a ratio of a length $\alpha$ of the cut 11a and a diameter $\gamma$ of the hole 11 is in a range of $0<\alpha/\gamma\leq500$. It is preferable that a ratio of a length $\beta$ of the cut 11b and the diameter $\gamma$ of the hole 11 is in a range of $0<\beta/\gamma\leq500$. Further, it is more preferable that they are in the range of $0<\alpha/\gamma\leq300$ and $0<\beta/\gamma\leq300$. The cuts 11a and 11b are surely generated in the case of using the manufacturing apparatus 2 illustrated in FIG. 2. In the case that $\alpha/\gamma$ or $\beta/\gamma$ is larger than 500, the length of the cut 11a or 11b becomes long with respect to the diameter $\gamma$ of the hole 11. In this case, a distance between the cuts 11a or the cuts 11b made at the adjacent holes 11 becomes short, and the cuts 11a or the cuts 11b are easily connected to each other during processing. Therefore, there is a risk that a rate of inducing film fracture becomes high.

Also, as illustrated in FIG. 5, the hole 11 includes the cut 11a positioned on the side of one surface 10a of the film 10, the cut 11b positioned on the side of the other surface 10b, and an area 110 positioned between the cut 11a and the cut 11b. The cut 11a, the cut 11b and the area 11c are communicated with each other. When the thickness direction of the film 10 is defined as a direction C, a center of the cut 11a, a center of the cut 11b, and a center of the area 11c may overlap with each other along the direction C.

The cut 11a has a shape of opening to one surface 10a of the film 10 and spreading toward one surface 10a from the side of the other surface 10b. At least one cross section in the cut 11a spreads so as to draw a roughly circular arcuate shape on the cross section toward one surface 10a from the side of the other surface 10b. The cut 11a may be positioned more on the side of one surface 10a than a center side of the film 10 in the thickness direction. The maximum depth of the cut 11a is about 0.5 μm to 100 μm for example. A diameter d1 which is the maximum diameter of the cut 11a along the direction D1 is about 100 μm to 6000 μm for example. A diameter d2 which is the minimum diameter of the cut 11a along the direction D1 is about 0.5 μm to 200 μm for example.

The cut 11b has a shape of opening to the other surface 10b and spreading toward the other surface 10b from the side of one surface 10a. At least one cross section in the cut 11b spreads so as to draw a roughly trapezoidal shape on the cross section toward the other surface 10b from the side of one surface 10a. The cut 11b may be positioned more on the side of the other surface 10b than the center side of the film 10 in the thickness direction. The maximum depth of the cut 11b is about 0.5 μm to 100 μm for example. A diameter d3 which is the maximum diameter of the cut 11b along the direction D1 is about 50 μm to 3000 μm for example, and is shorter than the diameter d1 of the cut 11a. A diameter d4 which is the minimum diameter of the cut 11b along the direction D1 is about 0.5 μm to 200 μM for example.

The area 11c is positioned between the cut 11a and the cut 11b in the direction C, and has a roughly rectangular shape on the cross section. The area 11c is, for example, a rectangular parallelepiped shape, a cubic shape or various polyhedrons. A depth of the area 11c is about 0.1 μm o 100 μm for example. A diameter d5 of the area 11c along the direction D1 is about 2 μm to 200 μm for example. A diameter d3 of the area 11c is roughly the same as the diameter d2 of the cut 11a and the diameter d4 of the cut 11b.

Figure 6:
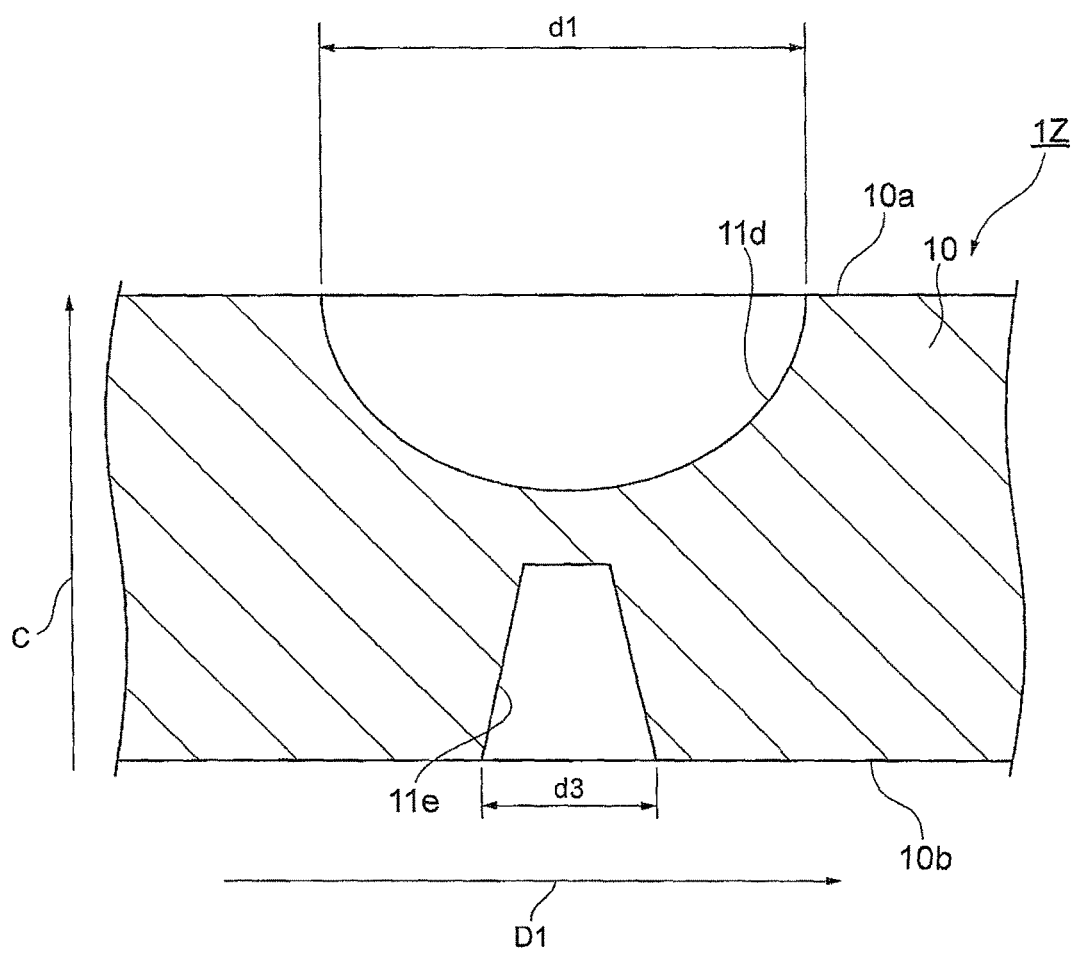
FIG. 6 is an enlarged sectional view of a periphery of a recess of a non-penetrated film.

The above is the description of the perforated film 1 for which the holes 11 are provided on the film 10, however, without forming the area 11c, a film in a non-penetrated state having a plurality of recesses (referred to as a non-penetrated film, hereinafter) may be manufactured. FIG. 6 illustrates an enlarged sectional view of the periphery of the recess of the non-penetrated film.

As illustrated in FIG. 6, for a non-penetrated film 1Z, many fine linear recesses are formed on the film 10. By widening a clearance between the supports 24 provided on both ends of the roll cutter 21 and the supports 25 provided on both ends of the roll cutter 22 illustrated in FIG. 2, the non-penetrated film 1Z can be manufactured. For a shape of the recess in the non-penetrated film 1Z, in the vicinity of the part where the cutting edge 211 and the cutting edge 221 intersect, that is, the part where the line L1 and the line L2 intersect in the plan view, the film 10 is pressurized simultaneously from one surface 10a and the other surface 10b. Therefore, a cut 11d is formed on one surface 10a of the film 10, and a cut 11e is formed on the other surface 10b of the film 10. The cut 11d is a part cut toward the other surface 10b, and the cut amount gradually increases toward the part where the cutting edge 211 and the cutting edge 221 intersect. The cut 11b is a part cut toward one surface 10a, and the cut amount gradually increases toward the part where the cutting edge 211 and the cutting edge 221 intersect. The cut 11d provided from one surface 10a of the film 10 and the cut 11e provided from the other surface 10b are not in contact with each other, and the film 10 remains in the thickness direction. That is, a hole passing through in the thickness direction is not formed on the film 10. In the non-penetrated film 1Z, the cut 11d is formed as the recess of one surface 10a, the cut 11e is formed as the recess of the other surface 10b.

Many fine linear recesses (cuts 11d and 11e) are provided on the non-penetrated film 1Z, and strength and tension that the film 10 originally has can be maintained. Also, by forming the recesses on the film 10, wettability of the non-penetrated film 1Z is improved, an anchor effect is generated to a coating liquid, an adhesive or ink or the like, and adhesion can be improved. Since the film 10 is not penetrated, gas permeability can be improved without letting bacteria and various germs pass through. Also, since the non-penetrated film 1Z is excellent also in water pressure resistance, development into a use demanding waterproofness and moisture permeability is possible.

Further, in the case of simultaneously pressurizing, from one surface and the other surface, a composite film formed by gluing a film with large elastic deformation (a PET film, for example) and a film with small elastic deformation (an LLDPE film, for example) together, a cut is generated on the film with the large elastic deformation, and a cut is not easily generated on the film with the small elastic deformation. Therefore, the gas permeability can be adjusted. For example, the PET film has a property of not easily transmitting oxygen and easily transmitting steam. On the other hand, the LLDPE film has a property of easily transmitting the oxygen and not easily transmitting the steam. Normally, by gluing these two kinds of films together, the composite film having a property of not easily transmitting the oxygen and the steam is attained. However, in the case of the non-penetrated film for which a plurality of cuts are provided only on the PET film in the composite film, the film having the property of easily transmitting the oxygen and not easily transmitting the steam is attained. That is, the non-penetrated film capable of selectively transmitting a gas can be formed. Also, since the non-penetrated film is a stacked layer, it can be handled as a package like a bag shape or a container lid for example.

Figure 7:
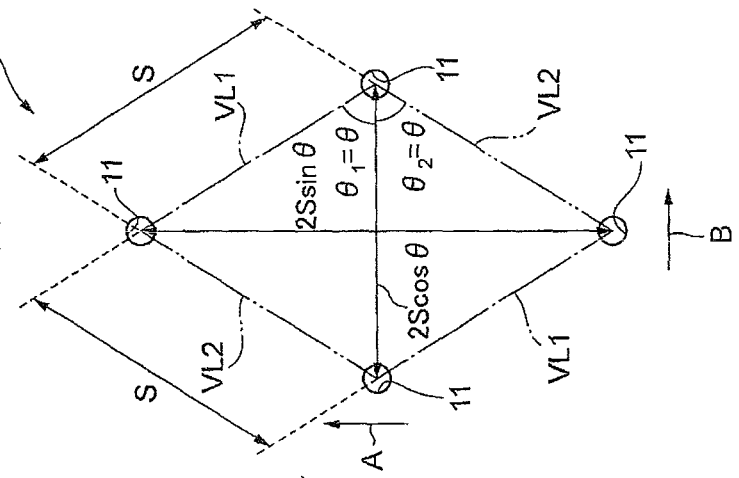
FIG. 7(a) is a diagram illustrating an arrangement of holes in a perforated film of a comparative example.
FIG. 7(b) is a diagram illustrating an arrangement example of holes in the perforated film in FIG. 1.
FIG. 7(c) is a diagram illustrating another arrangement example of holes in the perforated film in FIG. 1.
Figure 7:
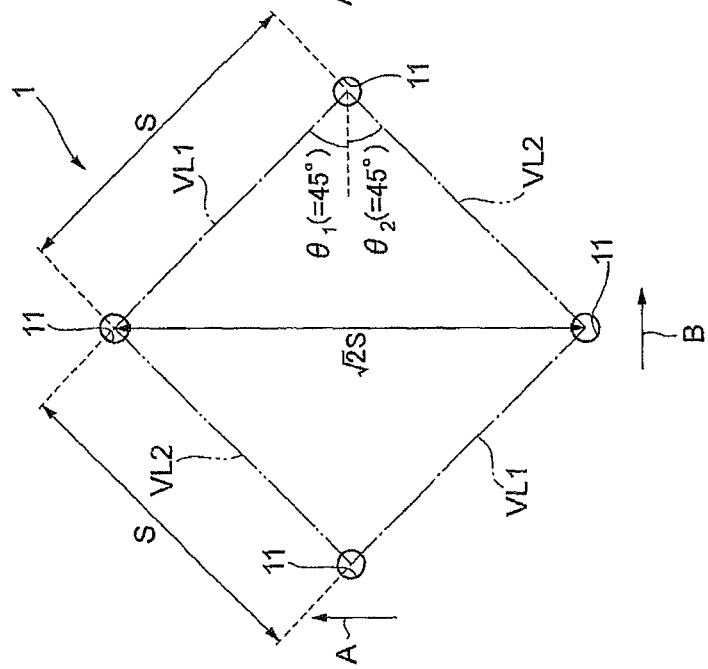
Figure 7:
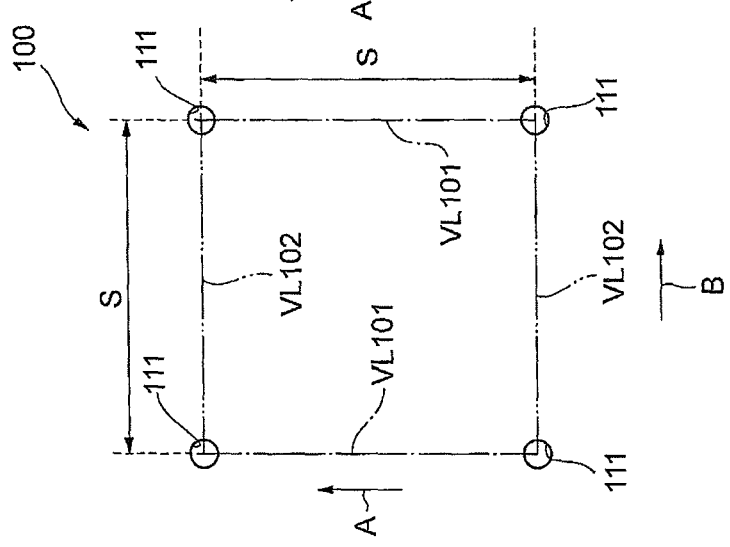

Next, an action effect of the perforated film 1 will be described. FIG. 7(a) is a diagram illustrating an arrangement of holes 111 in a perforated film 100 of a comparative example, FIG. 7(b) is a diagram illustrating one example of an arrangement of the holes 11 in the perforated film 1, and FIG. 7(c) is a diagram illustrating another example of the arrangement of the holes 11 in the perforated film 1.

As illustrated in FIG. 7(a), in the perforated film 100, the holes 111 are arranged at intersections of virtual lines VL101 and virtual lines VL102. The virtual lines VL101 extend along the direction A which is the longitudinal direction of the perforated film 100, and the virtual lines VL102 extend along the direction B which is the width direction of the perforated film 100. Also, a pitch of the virtual lines VL101 and a pitch of the virtual lines VL102 are equal to each other, and are S. In the perforated film 100, a distance between the two holes 111 adjacent to each other along the direction A becomes S, and a distance between the two holes 111 adjacent to each other along the direction B becomes S.

As illustrated in FIG. 7(b), in the perforated film 1, the plurality of virtual lines VL1 extend along the direction D1 different from the direction A which is the longitudinal direction of the perforated film 1 and the direction B which is the width direction of the perforated film 1, and the plurality of virtual lines VL2 extend along the direction D2 different from the direction A and the direction B. The virtual lines VL1 are inclined at 45° to the direction B. The virtual lines VL2 are inclined at 45° on the side opposite to the inclining direction of the virtual lines VL1 to the direction B. The virtual lines VL1 and the virtual lines VL2 orthogonally intersect. Also, the pitch P1 of the virtual lines VL1 and the pitch P2 of the virtual lines VL2 are equal to each other, and are S. In the perforated film 1, the distance between the two holes 11 adjacent to each other along the direction A becomes $2^{1/2} \times S$, and the distance between the two holes 11 adjacent to each other along the direction B becomes $2^{1/2} \times S$. Therefore, in the perforated film 1, compared to the perforated film 100, the distance between the two holes 11 adjacent to each other along the direction A and the direction B can be increased. Thus, in the perforated film 1, compared to the perforated film 100, the tensile strength in the longitudinal direction and the width direction can be improved. In the meantime, the number of the holes per stipulated area (perforation rate) of the perforated film 1 is the same as the perforation rate of the perforated film 100. Therefore, the perforated film 1 has the gas permeability (ventilation characteristic) equal to that of the perforated film 100.

As illustrated in FIG. 7(c), in the perforated film 1, in the case that the virtual lines VL1 are inclined at an angle θ (30°<θ<60°) to the direction B and the virtual lines VL2 are inclined at the angle θ on the side opposite to the inclining direction of the virtual lines VL1 to the direction B, the distance between the two holes 11 adjacent to each other along the direction A becomes 2S sin θ, and the distance between the two holes 11 adjacent to each other along the direction B becomes 2S cos θ. In the case that the angle θ is greater than 30°, since the distance between the two holes 11 adjacent to each other along the direction A becomes longer than S, compared to the perforated film 100, the distance between the two holes adjacent to each other along the direction A can be increased. Therefore, compared to the perforated film 100, the tensile strength in the longitudinal direction can be improved.

Also, in the case that the angle θ is smaller than 60°, since the distance between the two holes 11 adjacent to each other along the direction B becomes longer than S, compared to the perforated film 100, the distance between the two holes adjacent to each other along the direction B can be increased. Therefore, compared to the perforated film 100, the tensile strength in the width direction can be improved. From the above, in the perforated film 1, in the case that the angle θ is greater than 30° and is smaller than 60°, compared to the perforated film 100, the distance between the two holes adjacent to each other along the direction A and the direction B can be increased, and the tensile strength in the longitudinal direction and the width direction can be improved. In the meantime, the perforation rate of the perforated film 1 becomes 1/sin 2θ (>1) times the perforation rate of the perforated film 100. Therefore, in the perforated film 1, the perforation rate increases compared to the perforated film 100 so that the gas permeability (ventilation characteristic) can be improved.

Also, in the case of adjusting the pitch P1 and the pitch P2 so as to make the gas permeability of the perforated film 1 and the gas permeability of the perforated film 100 be the same level, the pitch P1 and the pitch P2 become larger than the pitch of the virtual lines VL101 and the pitch of the virtual lines VL102 of the perforated film 100. Therefore, since the distance between the holes 11 adjacent to each other can be further increased, the tensile strength in the longitudinal direction and the width direction can be further improved.

As described above, in the perforated film 1, the plurality of holes 11 are arrayed along the virtual lines VL1 and the virtual lines VL2. Since the virtual lines VL1 extend in the direction D1 different from the direction A and the direction B and the virtual lines VL2 extend in the direction D2 different from the direction A and the direction B, the array of the holes 11 along the virtual lines VL1 and the array of the holes 11 along the virtual lines VL2 are inclined to the direction A and the direction B. Also, the distance between the two holes 11 adjacent to each other along the direction A is long compared to the perforated film 100 illustrated in FIG. 7(a), and the distance between the two holes 11 adjacent to each other along the direction B is long compared to the perforated film 100. Therefore, in the perforated film 1, the tensile strength in the direction A and the direction B is improved. As a result, in the case that tension is applied in the direction A and the direction B, occurrence of fracture can be suppressed, and processability can be improved.

In the perforated film 1, a difference between the angle $\theta_1$ which is the inclination angle to the direction B of the virtual lines VlA and the angle $\theta_2$ which is the inclination angle to the direction B of the virtual lines VL2 is −5° or larger and +5° or smaller. In this case, since the holes 11 are arranged symmetrically to the direction B, stability of the tensile strength of the perforated film 1 is improved. As a result, in the case that tension is applied in the direction A to the perforated film 1, hole shape and film deformation can be reduced.

Second Embodiment

Figure 8:
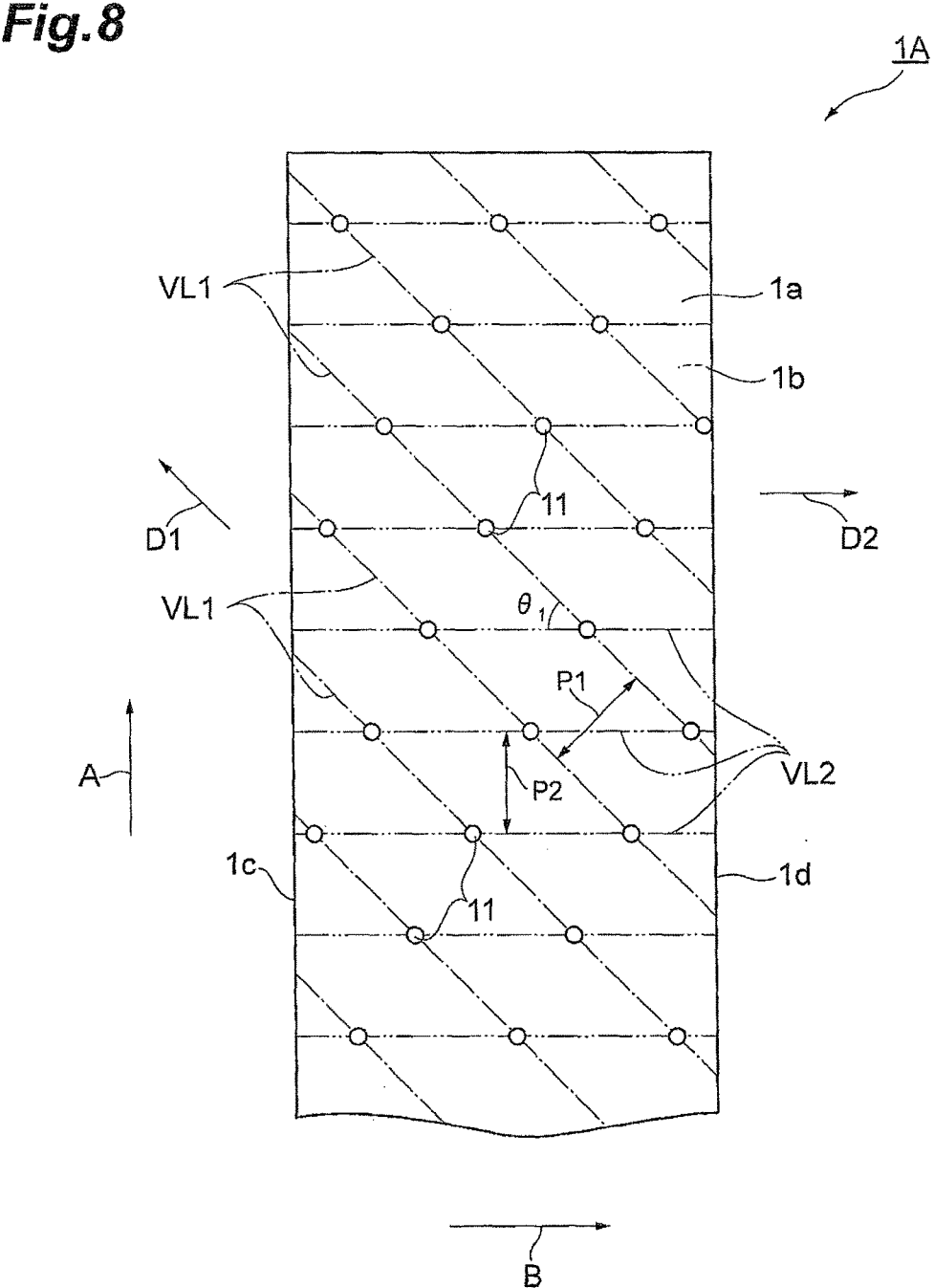
FIG. 8 is a plan view schematically illustrating a configuration of a perforated film relating to a second embodiment.

FIG. 8 is a plan view schematically illustrating a configuration of a perforated film relating to a second embodiment. As illustrated in FIG. 8, a perforated film 1A is different from the perforated film 1 in the first embodiment described above, in the direction D2 in which the plurality of virtual lines VL2 extend.

The direction D2 is the same direction as the direction B. That is, the plurality of virtual lines VL2 extend along the direction B. The virtual lines VL1 and the virtual lines VL2 intersect at the angle $\theta_1$. The angle $\theta_1$ is greater than 0° and is smaller than 90°. The angle $\theta_1$ may be 10° or greater in order to improve the tensile strength in the length direction, and may be 80° or smaller in order to improve the tensile strength in the width direction. Therefore, a plurality of parallelograms are formed by the virtual lines VL1 and the virtual lines VL2. The holes 11 are positioned at vertexes of the individual parallelograms.

The perforated film 1A is obtained by changing a shape of the cutting edges 221 of the roll cutter 22 in the manufacturing apparatus 2. Specifically, in the manufacturing apparatus 2 for the perforated film 1A, the plurality of cutting edges 221 of the roll cutter 22 are continuously provided in the axial direction of the roll cutter 22, and are provided at the pitch P2 in the circumferential direction.

In the above-described perforated film 1A, since the virtual lines VL1 extend in the direction D1 different from the direction A and the direction B, the array of the holes 11 along the virtual lines VL1 is inclined to the direction A and the direction B. Therefore, since the array of the holes 11 in the perforated film 1A is inclined to the direction A, compared to the perforated film 100 illustrated in FIG. 7(a), the tensile strength in the direction A is improved. As a result, in the case that tension is applied in the direction A, occurrence of fracture can be suppressed, and processability can be improved.

Specifically, in the perforated film 1A, in the case that the pitch P1 of the virtual lines VL1 and the pitch P2 of the virtual lines VL2 in the perforated film 1A are equal to the pitch of the virtual lines VL101 and the pitch of the virtual lines VL102 in the perforated film 100, the distance between the two holes 11 adjacent to each other along the direction B becomes S/sin $\theta_1$. Therefore, in the perforated film 1A, compared to the perforated film 100, the distance between the two holes adjacent to each other along the direction B can be increased, and the tensile strength in the width direction can be improved.

Also, in the perforated film 1A, since the holes 11 are not arrayed along the direction A, in the case that tension is applied in the longitudinal direction, force acting on the two holes 11 adjacent to each other is dispersed. Therefore, compared to the perforated film 100, the tensile strength in the longitudinal direction can be improved.

Further, the perforation rate of the perforated film 1A is 1/sin $\theta_1$ (>1) times the perforation rate of the perforated film 100. Therefore, in the perforated film 1A, the perforation rate increases compared to the perforated film 100 so that the gas permeability (ventilation characteristic) can be improved.

Third Embodiment

Figure 9:
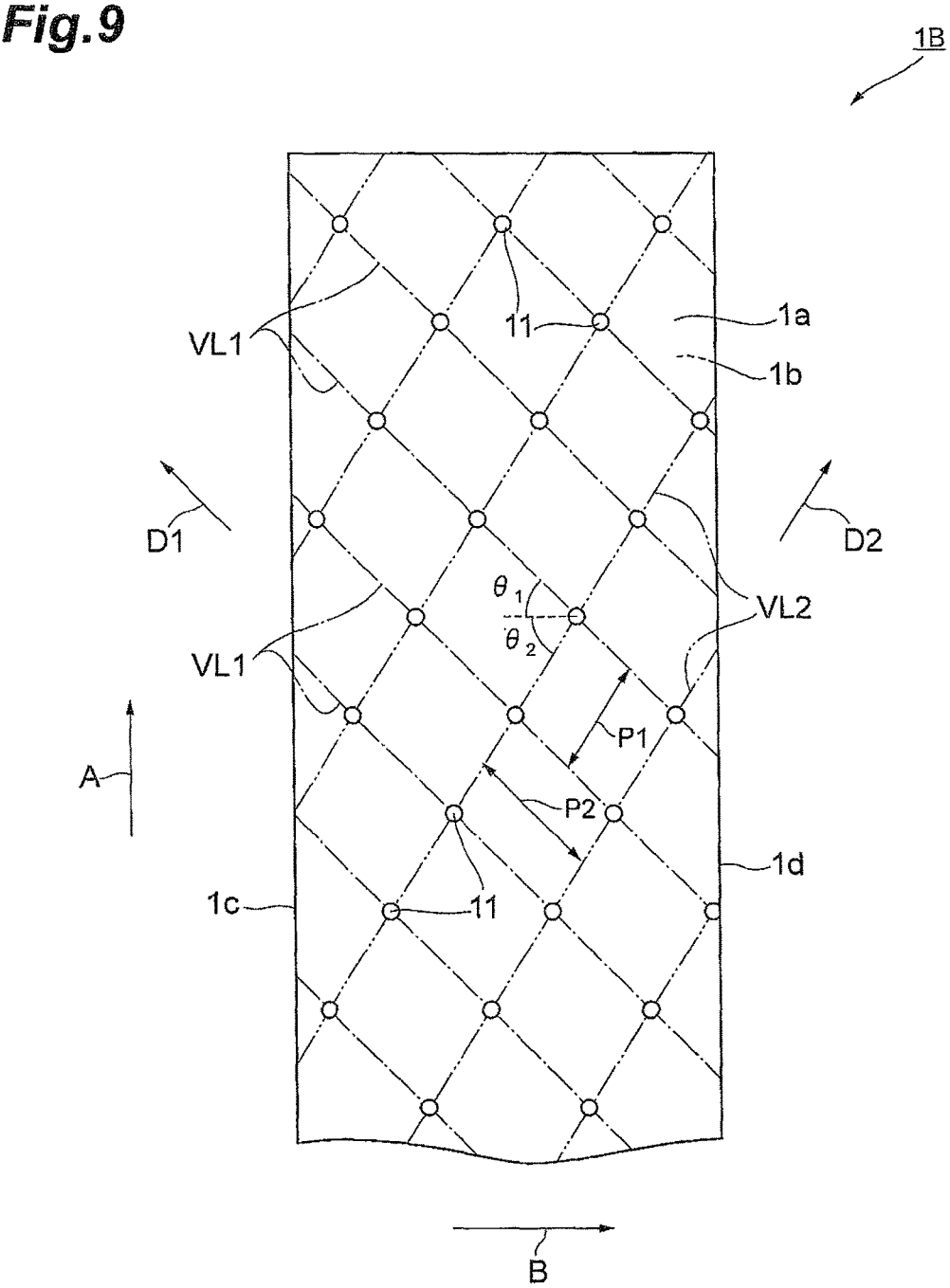
FIG. 9 is a plan view schematically illustrating a configuration of a perforated film relating to a third embodiment.

FIG. 9 is a plan view schematically illustrating a configuration of a perforated film relating to a third embodiment. As illustrated in FIG. 9, a perforated film 1B is different from the perforated film 1 in the first embodiment described above, in the direction D1 in which the plurality of virtual lines VL1 extend, the direction D2 in which the plurality of virtual lines VL2 extend, the pitch P1 and the pitch P2.

The direction D1 is different from the direction A and the direction B, and is inclined at the angle $\theta_1$ to the direction B. That is, the virtual lines VL1 are inclined at the angle $\theta_1$ to the direction B. The direction D2 is different from the direction A and the direction B, and is inclined at the angle $\theta_2$ on the side opposite to the inclining direction of the direction D1 to the direction B. That is, the virtual lines VL2 are inclined at the angle $\theta_2$ to the direction B. The angle $\theta_1$ and the angle $\theta_2$ are greater than 30° and are smaller than 60°. The angle $\theta_1$ and the angle $\theta_2$ may be 10° or greater in order to improve the tensile strength in the longitudinal direction, and may be 80° or smaller in order to improve the tensile strength in the width direction. Also, the angle $\theta_1$ and the angle $\theta_2$ are different.

The plurality of virtual lines VL1 are arrayed at a fixed interval, and the pitch P1 thereof is about 0.5 mm or longer for example. The plurality of virtual lines VL2 are arrayed at a fixed interval, and the pitch P2 thereof is about 0.5 mm or longer for example. The pitch P1 and the pitch P2 are different. Therefore, a plurality of parallelograms are formed by the virtual lines VL1 and the virtual lines VL2. The holes 11 are positioned at vertexes of the individual parallelograms. The pitch P1 and the pitch P2 are not limited to 0.5 mm or longer, and can be set to be shorter than 0.5 mm as needed.

The perforated film 1B can be obtained by changing the angle $\theta_1$ of the cutting edges 211 of the roll cutter 21 and the angle $\theta_2$ of the cutting edges 221 of the roll cutter 22 in the manufacturing apparatus 2 to desired angles.

Effects similar to that of the above-described perforated film 1 can be demonstrated by the above-described perforated film 1B, too.

The perforated film relating to the present invention is not limited to the embodiments described above. For example, in the perforated films 1 and 1B, the two holes 11 arranged closest among the plurality of holes 11 may be arrayed so as to be lined along a direction different from the direction A and the direction B. The tensile strength in the perforated films 1 and 1B declines as a distance between the two holes 11 adjacent to each other along the direction that tension is applied is shorter. Therefore, by arraying the two holes 11 arranged closest along the direction different from the direction A and the direction B, decline of the tensile strength in the direction A and the direction B can be suppressed.

Also, in the perforated film 1A and the perforated film 1B, the pitch P1 and the pitch P2 may be the same or may be different. Also, in the perforated film 1B, the angle $\theta_1$ and the angle $\theta_2$ may be the same or may be different.

Also, by laminating the perforated films 1, 1A and 1B, a stacked film may be attained. That is, by gluing the perforated film 1 to an unperforated film, a stacked film may be attained.

Further, the perforated films 1, 1A and 1B may be coated with various fluid substances. Here, coating indicates adhesion and fixation of an applied substance to the perforated film by hardening treatment or the like. By executing coating to the perforated film, a coating film that protects characteristics of the perforated film, or has new characteristics can be formed when using a product. Hereinafter, one example of a method of forming a coated material on the perforated film will be described using FIGS. 10(a)-10(d). FIGS. 10(a)-10(d) are diagrams illustrating a coating method to the perforated film 1.

Figure 10:
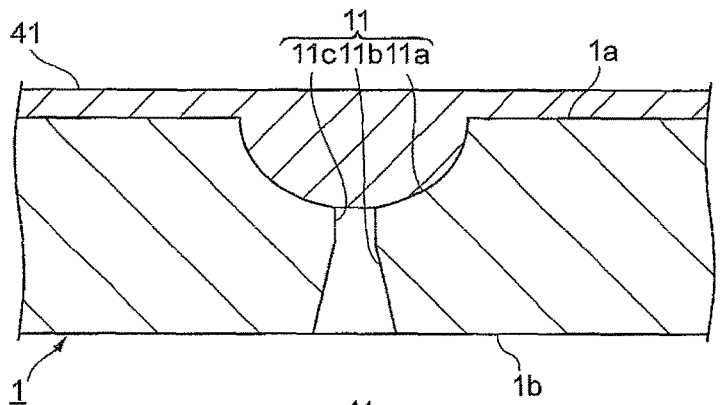
FIGS. 10(a)-10(d) are diagrams illustrating a coating method to a perforated film 1.
Figure 10:
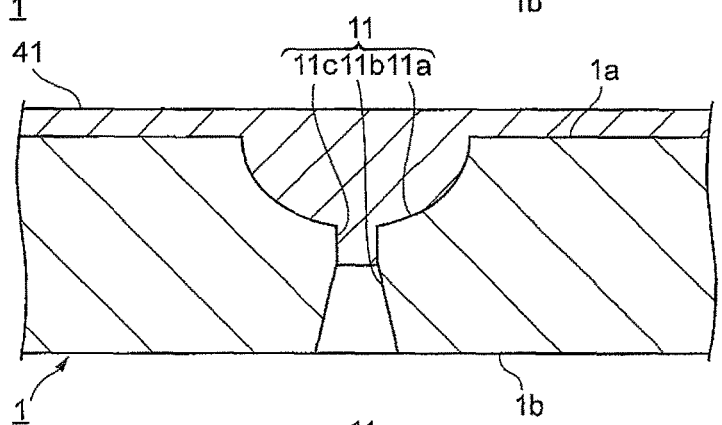
Figure 10:
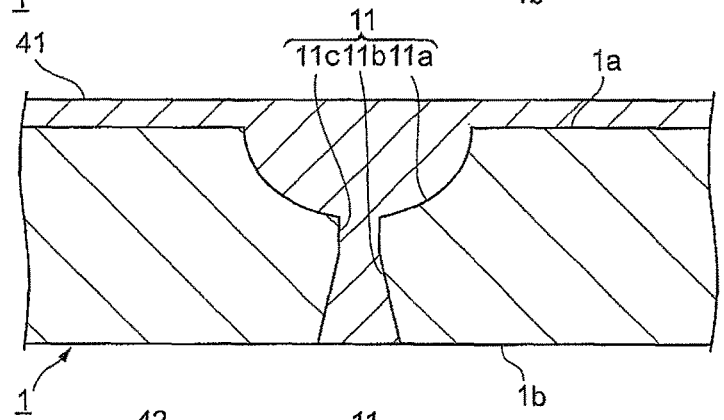
Figure 10:
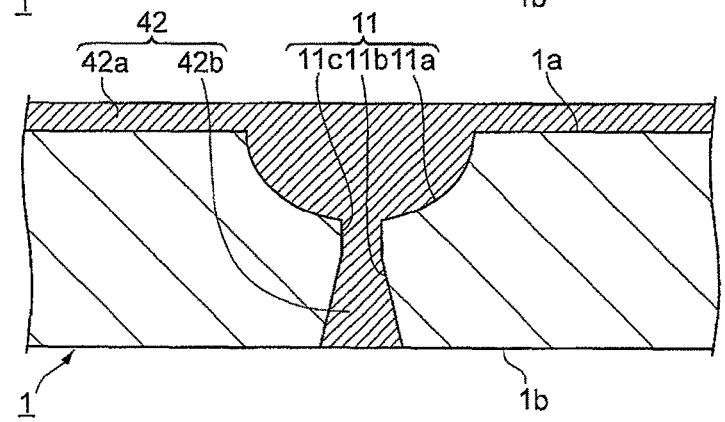

As illustrated in FIG. 10(a), a fluid substance 41 is applied to one surface 1a of the perforated film 1. The fluid substance 41 is applied to the perforated film 1 so as to fill the cut 11a in the hole 11. The fluid substance 41 is a substance in a paste shape, a liquid shape, a viscous body shape, a gel shape or the like having a certain degree of fluidity. Examples of the fluid substance 41 include a solution containing a conductive material or an active material, a conductive polymer, a heat-resistant resin, and the like. Examples of the conductive material include metal (gold, silver or the like) particulates, an alloy material, and the like. Examples of the active material include lithium cobaltate, iron lithium phosphate, manganese lithium phosphate, cobalt lithium phosphate, a carbon-based material (carbon black, graphite (black lead), graphene), and the like. Examples of the conductive polymer include polyacetylene, poly (p-phenylenevinylene), polypyrrole, polythiophene, polyaniline, and the like. Examples of the heat-resistant resin include polyimide, polyester, polybenzimidazole, and the like.

Next, as illustrated in FIG. 10(b), some of the fluid substance 41 intrudes into the area 11c through the cut 11a. Since an opening area of the cut 11a decreases from one surface 1a of the perforated film 1 toward the area 11c, a flow speed of the fluid substance 41 from the side of one surface 1a to the area 11c increases. Also, since the diameter d5 of the area 11c is as small as the diameter d2 which is the minimum diameter of the cut 11a as illustrated in FIG. 5, flow of the fluid substance 41 inside the area 11c easily becomes laminar flow. Therefore, the fluid substance 41 excellently intrudes into the area 11c from the cut 11a.

Next, as illustrated in FIG. 10(c), the fluid substance 41 that intrudes into the area 11c intrudes into the cut 11b. Since the flow of the fluid substance 41 that intrudes into the area 11c easily becomes the laminar flow as described above, the area 11c functions as a nozzle that increases the flow speed of the fluid substance 41, and the fluid substance 41 excellently intrudes into the cut 11b from the area 11c. Also, an opening area of the cut 11b increases from the area 11c to the other surface 1b. Therefore, at the cut 11b, the flow speed of the fluid substance 41 to the side of the other surface 1b decreases. By the speed decrease of the fluid substance 41 and surface tension of the fluid substance 41 on the other surface 1b, scattering from the perforated film 1 of the fluid substance 41 which intrudes into the cut 11b is suppressed.

Finally, as illustrated in FIG. 10(d), after the fluid substance 41 intrudes into the cut 11b, by executing hardening treatment for example to the fluid substance 41, a coated material 42 is formed on one surface 1a of the perforated film 1. Examples of the hardening treatment include heat treatment, light (visible light, infrared ray, ultraviolet ray) irradiation treatment, and the like. Also, the coated material 42 in a membrane shape may be formed by drying liquid or a viscous body which is the fluid substance 41. The coated material 42 is formed so as to cover one surface 1a, and to also fill the cut 11a, the cut 11b and the area 11c of the hole 11. A second part 42b of the coated material 42 filled in the cut 11b becomes a hook to a first part 42a covering the top of one surface 1a, and the anchor effect is demonstrated. Also, in the case of executing the coating onto the perforated film 1, since fine grooves of the cut 11a or the like are formed on one surface 1a of the perforated film 1 and a surface area increases, the adhesion of the coated material 42 can be improved. Thus, peeling of the coated material 42 from one surface 1a is suppressed. By the coating method described above, for example, by applying electrode paste to one surface 1a of the perforated film 1 and drying the electrode paste, a coating film that functions as an electrode can be manufactured.

Figure 11:
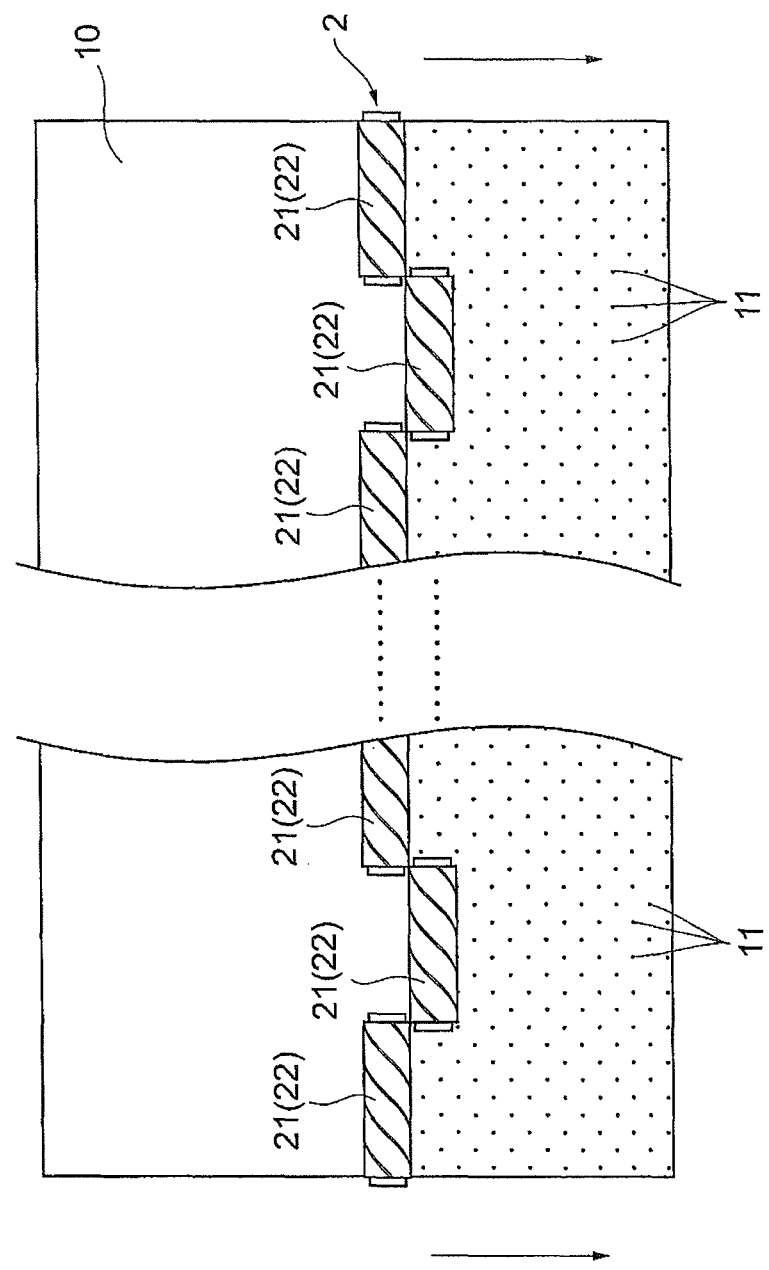
FIG. 11 is a plan view schematically illustrating a configuration of a modification of the manufacturing apparatus in FIG. 3.

As illustrated in FIG. 11, the manufacturing apparatus 2 may include a plurality of sets of the roll cutter 21 and roll cutter 22 arranged in the axial direction. The plurality of sets of the roll cutter 21 and roll cutter 22 may be arranged zigzag along the axial direction. That is, the individual sets of the roll cutter 21 and the roll cutter 22 may be arranged alternately on two lines extending along the axial direction. By the manufacturing apparatus 2, the perforated film 1 which has the holes 11 of the same hole diameter and is of a larger width can be obtained. For example, in the case of using a set of long-length roll cutter and roll cutter which have a relatively small diameter, the perforated film is deformed by loads acting on the set of roll cutters, and deflection is generated on the perforated film. This is because that a deflection amount of the perforated film is inversely proportional to the fourth power of a roll diameter of the roll cutter. In order to reduce the deflection amount of the perforated film, it is needed to increase the diameter of the roll of the roll cutter. In the case of preparing a roll cutter of a large diameter, even when it is to be attached to existing equipment, it is considered that it is difficult to secure an installation space of the roll cutter. Also, in the case of using the roll cutter of the large diameter, a strain is generated in a set of roll cutters by gravity. In this case, a difference is generated in the pressures when nipping the film. As a result, a difference is generated in a size of the hole provided on the film at the center and the end of the roll cutter, and the gas permeability of the perforated film is sometimes affected. In contrast, by providing the plurality of sets of the roll cutter 21 and the roll cutter 22, the diameter of at least one of the roll cutters 21 and 22 can be reduced, and a roll width can be reduced. Thus, the roll cutters 21 and 22 can be made compact, and are easily attached to a part of the existing manufacturing equipment. Also, the strain of the roll cutters 21 and 22 can be reduced, and formation accuracy of the holes 11 can be improved. Further, by making one of the roll cutters 21 and 22 small, the lengths of the cuts 11a and 11b provided on the film 10 can be reduced. Thus, reduction of the film strength can be suppressed.

EXAMPLES

Next, examples of the present invention will be described. The present invention is not limited by the following examples.

Figure 12:
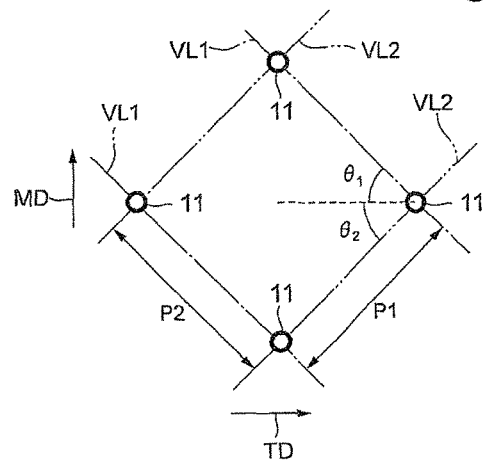
FIG. 12(a) is a diagram illustrating an arrangement of holes of a perforated film in example 1.
FIG. 12(b) is a diagram illustrating an arrangement of holes of a perforated film in example 2.
FIG. 12(c) is a diagram illustrating an arrangement of holes of a perforated film in example 3.
FIG. 12(d) is a diagram illustrating an arrangement of holes of a perforated film in comparative example 1.
Figure 12:
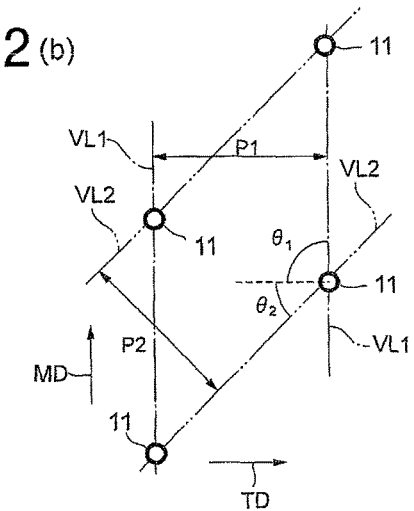
Figure 12:
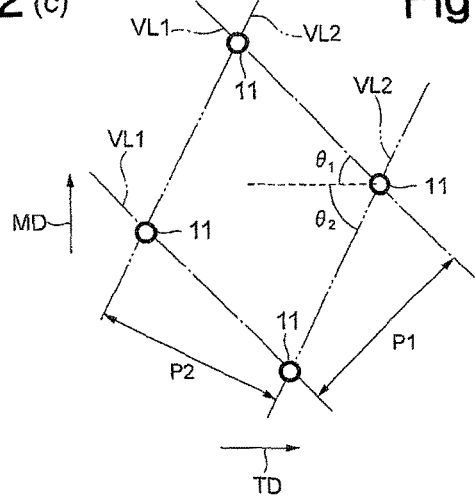
Figure 12:
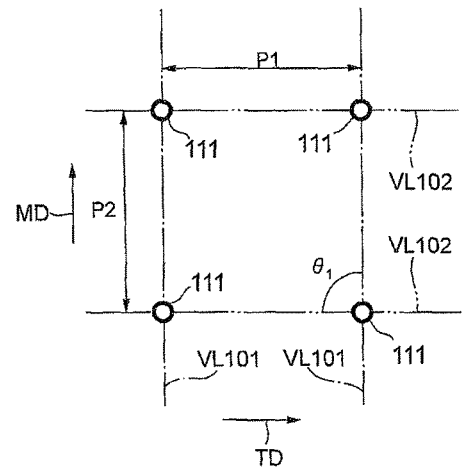

FIG. 12(a) is a diagram illustrating an arrangement of holes of a perforated film in example 1, FIG. 12(b) is a diagram illustrating an arrangement of holes of a perforated film in example 2, FIG. 12(c) is a diagram illustrating an arrangement of holes of a perforated film in example 3, and FIG. 12(d) is a diagram illustrating an arrangement of holes of a perforated film in comparative example 1.

Example 1

As illustrated in FIG. 12(a), in the perforated film in example 1, the holes 11 were arranged at intersections of the virtual lines VL1 inclined at the angle $\theta_1$ to TD, and the virtual lines VL2 inclined at the angle $\theta_2$ on the side opposite to the inclining direction of the virtual lines VL1 to TD. The pitch P1 of the virtual lines VL1 was 5 mm, the pitch P2 of the virtual lines VL2 was 5 mm, the angle $\theta_1$ was 45°, and the angle $\theta_2$ was 45°.

Example 2

As illustrated in FIG. 12(b), in the perforated film in example 2, the holes 11 were arranged at intersections of the virtual lines VL1 extending along MID, and the virtual lines VL2 inclined at the angle $\theta_2$ to ID. The pitch P1 of the virtual lines VL1 was 5 mm, the pitch P2 of the virtual lines VL2 was 5 mm, and the angle $\theta_2$ was 45°. That is, the angle $\theta_1$ formed by the virtual lines VL1 and TD was 90°.

Example 3

As illustrated in FIG. 12(c), in the perforated film in example 3, the holes 11 were arranged at intersections of the virtual lines VL1 inclined at the angle $\theta_1$ to TD, and the virtual lines VL2 inclined at the angle $\theta_2$ on the side opposite to the inclining direction of the virtual lines VL1 to TD. The pitch P1 of the virtual lines VL1 was 5 mm, the pitch P2 of the virtual lines VL2 was 5 mm, the angle $\theta_1$ was 45°, and the angle $\theta_2$ was 60°.

Comparative Example 1

As illustrated in FIG. 12(d), in the perforated film in comparative example 1, the holes 111 were arranged at intersections of the virtual lines VL101 extending along MD and the virtual lines VL102 extending along TD. The pitch P1 of the virtual lines VL101 was 5 mm, and the pitch P2 of the virtual lines VL102 was 5 mm. That is, the angle $\theta_1$ formed by the virtual lines VL101 and TD was 90°, and the angle $\theta_2$ formed by the virtual lines VL102 and TD was 0°.

(1) Perforation Processing Appropriateness Evaluation

By using a perforating apparatus to which roll blades were attached, and which was capable of perforation processing according to example 1 to example 3 and comparative example 1, the hole diameter was set to 10 μm, the perforation processing was performed to a film, and a speed during processing and presence/absence of fracture of the film were confirmed. As processing target films, a polyethylene terephthalate (PET) film with a thickness of 12 μm, and a biaxially oriented polypropylene (OPP) film with a thickness of 30 μm were used.

A determination method is as follows.

⊚: Processable at a processing speed of 80 m/min or higher
○: Processable at a processing speed below 80 m/min
Δ: Processable at a processing speed below 40 m/min
X: Processable at a processing speed below 20 m/min, or unprocessable due to fracture

TABLE 1

|  |  | Example 1 | Example 2 | Example 3 | Comparative example 1 |
|---|---|---|---|---|---|
| Perforation processing appropriateness | PET | ⊚ | ⊚ | ⊚ | X |
|  | OPP | ⊚ | ⊚ | ⊚ | Δ |

As illustrated in Table 1, in the case of using the PET film with the thickness of 12 μm as comparative example 1, fracture easily occurred and it was impossible to perform the perforation processing. Also, in the case of using the OPP film with the thickness of 30 μm as comparative example 1, it was possible to perform the perforation processing but fracture of the film occurred at the processing speed of 40 m/min or higher. On the other hand, in example 1 to example 3, in the case of using any film, fracture did not occur and it was possible to perform the perforation processing without a problem even at the processing speed of 80 m/min or higher.

(2) Hole Diameter Measurement after Perforation Processing

An actual hole diameter of the OPP film to which the perforation processing was performed by setting the hole diameter to 10 μm in (1) was measured by using a microscope.

(3) Tensile Strength Evaluation

Based on JIS K7127, the tensile strength of MD and TD was measured. As a measurement target film, the OPP film to which the perforation processing was performed in the above-described perforation processing appropriateness evaluation was used. The tensile strength of MD of an unperforated OPP film was 50 N/15 mm, and the tensile strength of TD was 75 N/15 mm.

(4) Gas Permeability Evaluation

Oxygen permeability and steam permeability of the OPP film to which the perforation processing was performed in (1) were measured. It is defined that the oxygen permeability of the unperforated OPP film is 1000 cc/(m²·day·atm), and the steam permeability is 5 g/(m²·day).

TABLE 2

| | Example 1 | Example 2 | Example 3 | Comparative example 1 | Unperforated |
|---|---|---|---|---|---|
| Hole diameter (μm) | 10 | 12 | 10 | 43 | — |
| Tensile strength (MD) (N/15 mm) | 36 | 38 | 36 | 13 | 50 |
| Tensile strength (TD) (N/15 mm) | 52 | 15 | 53 | 16 | 75 |
| Oxygen permeability (cc/(m²·day·atm)) | 20000 | 14000 | 19000 | 70000 | 1000 |
| Water vapor permeability (g/(m²·day)) | 100 | 71 | 95 | 400 | 5 |

As illustrated in Table 2, when the actual hole diameter was measured, it was the hole diameter almost as set in examples 1-3. In contrast, in comparative example 1, the actual hole diameter was about four times larger than 10 μm that was set. In comparative example 1, it is considered that the hole was torn during the perforation processing, and the hole diameter became big. Also, in comparative example 1, the tensile strength was low for both MD and TD, and was lowered by about 70% compared to the unperforated OPP film. In example 1 and example 3, the tensile strength of MD and TD was lowered by about 30% compared to the unperforated OPP film. In example 2, the holes were arranged along MD. Therefore, in example 2, even though the tensile strength of TD was low, the tensile strength of MD was roughly equal to that in example 1 and example 3.

When the oxygen permeability and water vapor permeability were measured in examples 1-3, the permeability according to a perforation area was provided. In contrast, in comparative example 1, though the perforation area was the same as that in example 1, the permeability was about three times higher. From this result as well, it is considered that the hole diameter became big in comparative example 1.

According to the above evaluation results, in all of example 1 to example 3, it was confirmed that perforation processing appropriateness was higher than that in comparative example 1, the hole diameter and the gas permeability as designed were reproduced, and the tensile strength of MD was high. Also, in example 1 and example 3, it was confirmed that the tensile strength of TD was higher than that in comparative example 1. By example 1 to example 3, the distance between the two holes 11 adjacent to each other along MD can be made longer than the distance between the two holes 111 adjacent to each other along MD in comparative example 1. As a result, the perforation processing appropriateness can be improved and the tensile strength of MD can be improved. By example 1 and example 3, the distance between the two holes 11 adjacent to each other along TD can be made longer than the distance between the two holes 111 adjacent to each other along TD in comparative example 1. As a result, the tensile strength of TD can be improved.

(5) Gas Permeability Measurement of Perforated Film and Non-Penetrated Film

By using a perforated film for which through-holes with the hole diameter of 10 μm and a cut length of 100 μm are provided at positions similar to example 1 on an OPP film with the thickness of 30 μm and using a non-penetrated film with the cut length of 100 μm provided with a non-penetrated area of about 5 μm in the thickness direction, the oxygen permeability and the steam permeability were measured. It is defined that the oxygen permeability of the non-processed OPP film is 1000 cc/(m²·day·atm), and the steam permeability is 5 g/(m²·day).

TABLE 3

| | Perforated film | Non-penetrated film | Non-processed |
|---|---|---|---|
| Oxygen permeability (cc/(m²·day·atm)) | 20000 | 3800 | 1000 |
| Water vapor permeability (g/(m²·day)) | 100 | 10 | 5 |

As illustrated in Table 3, compared to the non-processed film, since the perforated film was provided with the through-holes, the high gas permeability was indicated. Also, though the non-penetrated film was not provided with the through-holes, the gas permeability was higher than that of the non-processed film.

According to the above evaluation results, it was confirmed that a gas permeation amount can be controlled by providing the through-holes or the non-penetrated area on the film. Also, by controlling a non-penetrated area length of the non-penetrated film, the gas permeability can be adjusted further according to uses and purposes.

(6) Coated Material Adhesion Evaluation of Perforated Film and Non-Penetrated Film A perforated film provided with through-holes at positions similar to example 1 and a non-penetrated film provided with a non-penetrated area of about 5 μm in the thickness direction on each of aluminum foil with the thickness of 25μ and copper foil with the thickness of 15μ were manufactured. Further, as comparative example 2, by using a nip roll having thin and long conical nails, metallic foil provided with through-holes in a trapezoidal shape on the cross section by pressing the nip roll to one surface of the metallic foil at positions similar to example 1 was prepared. By applying electrode paste to each metallic foil and drying it, an electrode having the coated material was manufactured. Also, as a reference example, by applying the electrode paste to flat metallic foil and drying it, an electrode having the coated material was manufactured. Then, the adhesion of the coated material to each metallic foil and the adhesion of the coated material to the metallic foil in the reference example were compared respectively. The electrode was manufactured through the following procedure.

[Manufacture of Positive Electrode]

To roll-like aluminum foil with the thickness of 25 μm to which the perforation processing or non-penetrated area formation processing was executed, the electrode paste whose main component was activated carbon particles with an average particle diameter of 2 μm was applied by using a roll coater. By drying the electrode paste, a positive electrode was manufactured.

[Manufacture of Negative Electrode]

To roll-like copper foil with the thickness of 15 μm to which the perforation processing or non-penetrated area formation processing was executed, the electrode paste whose main component was black lead particles with the average particle diameter of 5 μm was applied by using a roll coater. By drying the electrode paste, a positive electrode was manufactured.

TABLE 4

| | | Perforated film | Non-penetrated film | Comparative example 2 |
|---|---|---|---|---|
| Adhesion improvement rate (times) | Aluminum foil | 2.2 | 1.5 | 1.2 |
| | Copper foil | 2.3 | 1.7 | 1.1 |

Table 4 illustrates the adhesion power of the coated material to the perforated film, the non-penetrated film and the metallic foil in comparative example 2 when the adhesion power of the coated material to the metallic foil in the reference example is defined as 1.0 times. As illustrated in Table 2, in the perforated film, compared to the case of using the metallic foil to which the perforation processing was not performed (the case of the reference example), the adhesion of the coated material to the metallic foil was improved to be about more than twice as high. Also, in the non-penetrated film, compared to the case of the reference example, the adhesion of the coated material to the metallic foil was improved to be about more than 1.5 times higher. On the other hand, in comparative example 2, compared to the reference example, the adhesion of the coated material to the metallic foil was improved, however, an effect of the perforation processing was small, and the coated material was more easily peeled off from the metallic foil compared to the perforated film and the non-penetrated film.

According to the above evaluation results, it was confirmed that the perforation processing appropriateness of the metallic foil was high in the perforated film, and the adhesion of the coated material to the metallic foil was improved to be about more than twice as high as that in the reference example. In order to further improve the adhesion of the coated material to the metallic foil, it is also possible to make an interval between a hole and a hole be smaller than that in examples 1-4.

INDUSTRIAL APPLICABILITY

The perforated film relating to one form of the present invention can be used for various uses such as vaporized substance permeation of an insect-repelling component permeable membrane or the like, sterilization gas permeation of an ETO gas permeable membrane or the like, aromatic substance permeation of an aromatic component permeable membrane or the like, contents generation gas permeation of a fermented food gas permeable membrane or the like, a flexible substrate, an electricity storage device, a filter, and steam vent during microwave oven cooking, for example.

REFERENCE SIGNS LIST 1, 1A, 1B ... perforated film, 11 ... hole, 11a ... cut (first cut), 11b ... cut (second cut), 41 ... fluid substance, 42 ... coated material, A ... direction, B ... direction (width direction), D1 ... direction (first direction), D2 ... direction (second direction), VL1 ... virtual line (first virtual line), VL2 ... virtual line (second virtual line), $\theta_1$ ... angle (first angle), $\theta_2$ ... angle (second angle), $\alpha, \beta$ ... length, $\gamma$ ... diameter

The invention claimed is:

1. A perforated film provided with holes,
wherein each of the holes is disposed on an intersection of a first cut provided on a first virtual line extending along a first direction and a second cut provided on a second virtual line extending along a second direction,
wherein the first direction is different from a width direction and a direction orthogonal to the width direction,
wherein the second direction is different from the width direction and the direction orthogonal to the width direction,
wherein at least one of first cross sections in the first cut spreads so as to form a circular arcuate shape toward a first surface side of the perforated film from a second surface side of the perforated film,
wherein at least one of second cross sections in the second cut spreads so as to form a trapezoidal shape toward the second surface side from the first surface side, and
wherein an area is positioned between the first cut and the second cut in a thickness direction of the perforated film, the area connecting the first cut and the second cut, and having rectangular cross section shape.

2. The perforated film according to claim 1,
wherein the first direction is inclined at an angle larger than 30° and smaller than 60° to the width direction, and
wherein the second direction is inclined at an angle larger than 30° and smaller than 60° to the width direction.

3. The perforated film according to claim 1,
wherein, in the first direction, a ratio of a length $\alpha$ of the first cut and a diameter $\gamma$ of the hole is $0 < \alpha/\gamma \le 500$, and
wherein, in the second direction, a ratio of a length $\beta$ of the second cut and the diameter $\gamma$ of the hole is $0 < \beta/\gamma \le 500$.

4. The perforated film according to claim 1,
wherein a difference between a first angle which is an inclination angle of the first virtual line to the width direction and a second angle which is an inclination angle of the second virtual line to the width direction is −5° or larger and +5° or smaller.

5. The perforated film according to claim 1,
wherein the first virtual line and the second virtual line orthogonally intersect.

6. The perforated film according to claim 1,
wherein two holes arranged closest among the holes are lined along a direction different from the width direction and the direction orthogonal to the width direction.

7. A coating film comprising:
a perforated film according to claim 1; and
a membrane formed by applying a liquid or a viscous body on at least one surface of the perforated film, and drying the liquid or the viscous body.

8. An electricity storage device comprising an electrode including:
a perforated film according to claim 1; and
a coated material formed by applying electrode paste on at least one surface of the perforated film, and drying the electrode paste.

* * * * *